United States Patent [19]

Bankowski, Jr. et al.

[11] 3,909,803

[45] Sept. 30, 1975

[54] MULTI-PHASE CCD SHIFT REGISTER OPTICAL SENSOR WITH HIGH RESOLUTION

[75] Inventors: Walter F. Bankowski, Jr., Poughkeepsie; Vijay R. Kumar, Fishkill; William McGovern; John D. Tartamella, both of Poughkeepsie, all of N.Y.

[73] Assignee: IBM Corporation, Armonk, N.Y.

[22] Filed: Nov. 2, 1972

[21] Appl. No.: 303,163

[52] U.S. Cl. ........ 340/173 LS; 307/304; 340/173 R; 357/24; 357/31

[51] Int. Cl.² .................. G11C 11/42; G11C 19/28; G11C 11/40

[58] Field of Search .................. 340/173 R, 173 LS; 317/235 B, 235 G, 235 N; 307/303, 304; 357/24, 31

[56] References Cited

UNITED STATES PATENTS

| | | | |
|---|---|---|---|
| 3,621,283 | 11/1971 | Teer | 317/235 N |
| 3,801,884 | 4/1974 | Sequin | 317/235 G |

OTHER PUBLICATIONS

Altman, The New Concept for Memory and Imaging: Charge Coupling, Electronics, 6/21/71, pp. 50–59.

Weimer, Self-Scanned Image Sensors Based on Charge Transfer by the Bucket-Brigade Method, IEEE Transactions on Electron Devices, 11/71, pp. 996–1003.

*Primary Examiner*—Stuart N. Hecker
*Attorney, Agent, or Firm*—James E. Murray

[57] ABSTRACT

This specification describes a scheme for improving the optical resolution of charge coupled device (CCD) shift registers by permitting optical sensing in potential wells under adjacent or closely spaced gates. First one gate in each of the bits of the shift register is energized for optical sensing and the information so sensed is read out of the shift register and stored in memory of some kind. Thereafter, an adjacent or closely spaced gate is energized to sense data optically and this information is read out of the shift register and stored. This is continued until all of the possible gates, or as many as desired, are used for optical sensing. When optical sensing is complete the stored data is reorganized by an interleaving procedure that leaves the data in coherent form.

3 Claims, 3 Drawing Figures

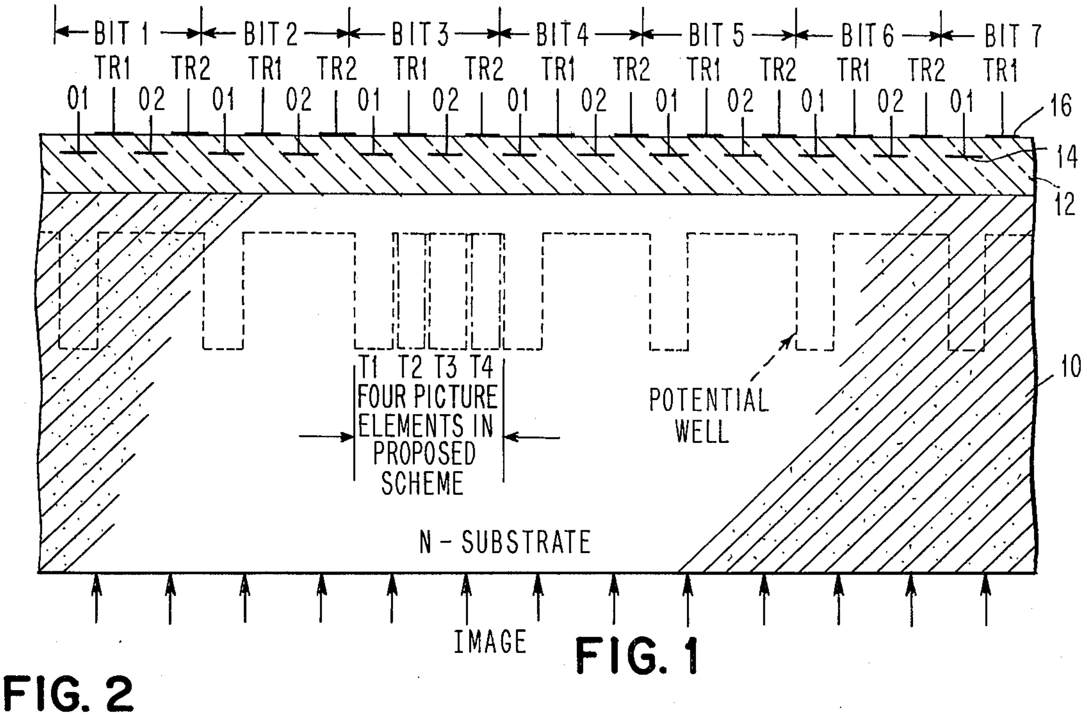
FIG. 1
FIG. 2
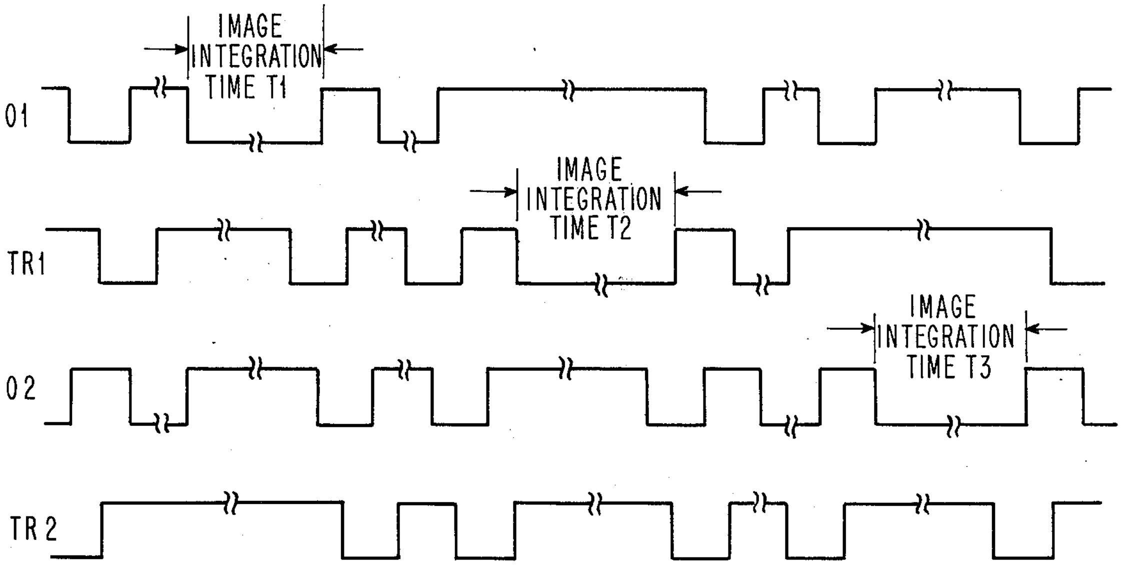
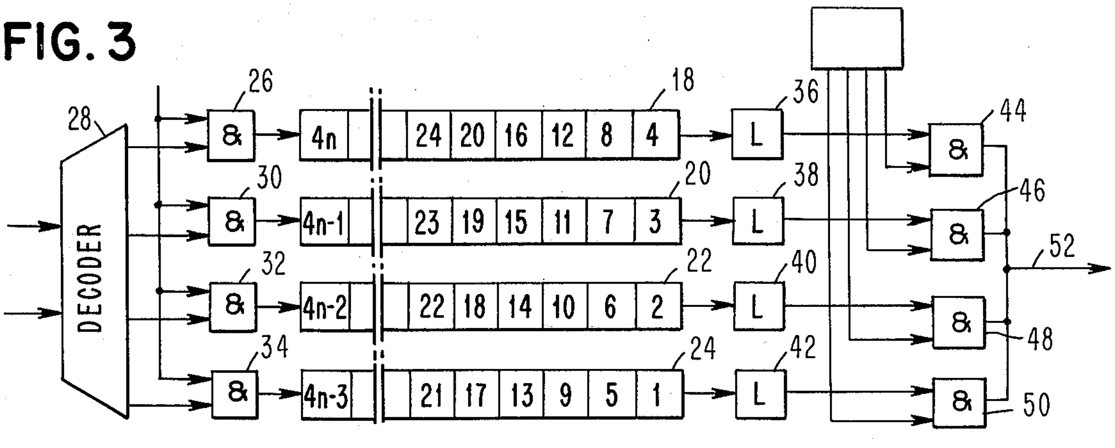

MULTI-PHASE CCD SHIFT REGISTER OPTICAL SENSOR WITH HIGH RESOLUTION

BACKGROUND OF THE INVENTION

The present invention relates to the use of CCD shift registers to perform optical sensing and, more particularly, it relates to a scheme for increasing the optical resolution of such shift registers.

It is well known that charge coupled devices or CCD's can be used to optically sense data when arranged in shift registers containing a number of bits, each bit having a plurality of electrodes. In such shift registers, a potential well is created under one of the electrodes in each bit of the shift register and exposed to light. When this is done, charge accumulates in these walls. This charge is a function of the intensity and duration of the applied light in the proximity of the well. The data stored in the well is then shifted out of the shift register, bit by bit, by changing the potentials on the electrodes one at a time so that the data spills out of the sensing potential well into a well created under an adjacent electrode, and so on from one well to another until it passes from the shift register.

As can be seen, the resolution of this CCD optical sensor is limited to one sensing well per bit of the shift register. For instance, if the shift register had four electrodes in each bit this would mean that only one of the four electrodes would be used for sensing. Thus, the optical resolution of the shift register would be one sensing well for every four electrodes. It would be nice if the optical resolution of this optical sensor would be increased to one sensing well for every two electrodes, or possibly even one sensing well for every one of the electrodes of the four-phase shift register. However, up until now it has not been possible because simultaneous sensing in wells under adjacent or alternate electrodes caused loss of data. This is the result of the unintended spilling of charge from one potential well into an adjacent potential well. For instance, in the four-phase shift register, assume that data is to be optically sensed simultaneously on alternate electrodes. Then, say the first and third electrodes would have a potential applied to them and then be subjected to the light from some source. Therafter, in reading the data out of the shift register, the second and fourth electrodes would be reduced in potential and the sensing electrodes would be raised in potential in the process of moving the data through the stages of the shift register to the output of the shift register. If this were done, charge from the sensing wells under both the first and third electrodes would pour into the wells between them, thus causing the smearing of the data.

In accordance with the present invention, the optical resolution of a CCD shift register is increased by sensing sequentially under adjacent or alternate electrodes. First, a well is created under one of the electrodes in each of the bits and used for optical sensing. Then, the information so sensed is read out of the shift register and stored in memory of some kind. Thereafter, a well is created under an adjacent or closely spaced electrode and is used to sense data optically and this information is, likewise, read out of the shift register and stored. This procedure is continued until all of the possible electrodes, or as many as desired, are used for optical sensing. Then, the stored data is interleaved and transmitted to the user in coherent form. Thereafter, with this scheme it is not only possible to do optical sensing with alternate electrodes, but we are able to sense with every electrode permitting resolution of one sensing well for every electrode instead of one for every bit.

Therefore, it is an object of the present invention to increase the resolution of CCD optical scanners.

Another object of the present invention is to increase the optical resolution of CCD shift registers by performing sequential optical senses with adjacent electrodes and using storage to allow the reading out of the sensed data in coherent form.

The foregoing and other objects, features and advantages of the present invention will be apparent from the following description of a preferred embodiment of the invention as illustrated in the accompanying drawings, of which:

DESCRIPTION OF THE DRAWINGS

FIG. 1 is a section through a four-phase shift register which senses light in accordance with the present invention;

FIG. 2 shows the timing diagram and pulses applied to the electrodes of the shift register in FIG. 1 to sense light in accordance with the present invention; and FIG. 3 is a block diagram of a system for the storage and reading out of data in accordance with the present invention.

DETAILED DESCRIPTION OF THE INVENTION

FIG. 1 shows a section through a charge-coupled device shift register or CCD shift register. As can be seen, an N- substrate 10 contains a thin oxide layer 12 on one side thereof. In that thin oxide layer 12 are a plurality of polysilicon gates or electrodes 14, numbered 01 and 02, and on top of the thin oxide layer 12 are a number of metal gates or electrodes 16, numbered TR1 and TR2 that are the same size as the polysilicon gates 14. Each set of gates consisting of one 01, TR1, 02 and TR2 gate arranged in sequence constitutes one bit of a CCD shift register with the first bit, or bit 1, of the shift register on the left hand side of the drawing and continuing on to bit 7 of the register which is partially shown on the right hand side of the drawing. Of course, the shift register contains many more bits. However, the seven shown here are sufficient to describe the present invention.

The shifting operation of such a shift register is accomplished by controlling the voltage on the various electrodes to shift the data stored in the register from bit to bit so that the data moves along from bit 1 to bit 2 to bit 3 and so on to the last bit in the register. In FIG. 2, the first column of pulses shows the sequence of pulses necessary to accomplish shifting. First, all the 01 electrodes of the shift register have a negative potential applied thereto creating a potential well under each of the 01 gates. This creates a depletion region or potential well under each of the 01 gates of the shift register. These potential wells hold positive charge or minority carriers which constitute data stored in the well. The amount of charge stored is proportional to the exposure duration and light intensity in the proximity of the potential well. After the 01 gates are brought down, all the TR1 gates are reduced in potential to create a potential well under the TR1 gates and then the 01 gates are increased in potential to eliminate the wells under the 01 gates. As the potential on the 01 gates is increased the positive charge stored in the wells under the 01 gates pours out of those wells and into the newly created wells under the TR1 gates. Thus, the data in each bit of the shift register has been shifted in position from under the 01 gates to under the TR1 gate in the bit. Once the data has been shifted, each 02 gate is dropped in potential creating a well under the 02 gates and then the TR1 gates are raised in potential to dump the positive charge stored under the TR1 gate into the well under the 02 gates so that the data in each storage bit has been shifted to a position under the 02 gate. Once the data is under the 02 gates, the data is shifted under the TR2 gates by decreasing the potential on the TR2 gate and then increasing the potential under the 02 gate, as illustrated in FIG. 2. Now, the voltage on each 01 gate is decreased and the voltage on each TR2 gate is increased to move the data from under the TR2 gate to under the 01 gate in the next bit. Therefore, it can be seen that the data can be shifted from gate to gate in each bit and then out of the bit into the next bit in the shift register by repeating the above-described sequence until the data stored in bit 1 is shifted through each gate of the shift register and out the end of the shift register. As pointed out, such CCD shift registers and their operation are well known in the art and it has been known to use them for optical sensing.

Optical sensing is accomplished by using essentially the same sequence of pulses except one of the periods of time used in the sequence is greatly expanded to generate data from the image. First, let us assume that the optical sensing is to be accomplished during the 01 pulse time. Then, as before, all the 01 gates are reduced in potential. This time, however, the period T1 is about 100 times as long as the period used during the shifting mode of operation described above. While the 01 gates are down, light is applied to the back of the substrate as illustrated by arrows. This causes positive charge to collect in the potential wells under each of the 01 gates, the amount of charge in any particular well being proportional to the time and intensity of incident light in the proximity of that well. Therefore, information as to the image is stored in the wells under the 01 gates in the form of positive electrical charge where the amount of charge stored in any particular well is dependent on the time and intensity of the light applied to the substrate in the proximity of that well.

As pointed out above, the period T1 during which the 01 pulse is down, or the image integration period, is approximately 100 times the length of the period when 0 is down during the shifting of data through the shift register. The actual length is dependent upon the intensity of the light from the incident image; the stronger the light, the less time is necessary to maintain the 01 pulse down in order to integrate data as to the image. However, no matter how long the period is, once sufficient time passes to accumulate enough charge to store the data as to the image, the TR1 pulse is brought down and at a short time thereafter the 01 pulse is brought up so that the data gathered under the 01 electrode is shifted into a well under the TR1 gate.

This is the start of a shift operation in which the data obtained is shifted out of the shift register so that a series of pulses of sequence and duration described previously occurs until all the data is shifted out of the register; the data in the last bit or bit n first and the data in the first bit or bit 1 last. Once the shifting of data out of the register is completed, the register is in condition to be used to sense and, in accordance with the prior art, it was done by again sensitizing the 01 gate by the application of a negative pulse for the period T1 necessary to cause integration of an image under the gate. As can be seen, in a shift register having four gates per bit, the optical resolution of the shift register would be one sensing well for every four gates. Of course, it would be desirable to have higher resolution. However, this was not possible with the prior art because in the reading of the data out of the shift register, the shifting of charge from well to well would cause loss of data. This can best be seen by referring back to FIG. 1 and assuming that image sensing is to be simultaneously accomplished under the 01 and 02 gates. Thus, in all the bits both gates would be reduced in potential at the same time and the back of the substrate exposed to the image. Once the image integration period is completed the shift operation would be started and the TR1 and/or TR2 gates would be reduced in potential and the potential on the 01 and 02 gates would be increased so that charge would pour from under the 01 gate into the well under the TR1 gate and charge in the well under the 02 gate will be shifted to the well under the TR2 gate. This, of course, will happen. However, CCD shift registers are not unidirectional so that charge from each 01 gate will not only go to the right into a well under the adjacent TR1 gate, but would also move to the left into the well under the previous TR2 gate. Likewise, the charge under the 02 gate will move in both directions so that there will be a splitting of the charge from under the 02 gate between the adjacent TR1 and TR2 gates. Therefore, the increase in the number of gates energized for optical sensing does not result in any increase in resolution and the best resolution that can be obtained according to the prior art using a four-phase shift register would be a resolution of one sensing well for every four gates.

In accordance with the present invention, the resolution is increased to one sensing well for every gate or to any resolution up to that value desired by optically sensing under adjacent or alternate gates sequentially. First a reading operation as described above is performed using potential wells under all the 01 gates as the optical sensors. The data obtained by this first read operation is shifted out and stored in a shift register 18, shown in FIG. 3. Thereafter, a second optical sensing step is performed using potential wells under all the TR1 gates and this data is shifted out and stored in register 20. Continuing, a third optical sensing step is performed using wells under the 02 gates as the data collectors and the data obtained thereby read out of the CCD shift registers and stored in register 22 and, finally, wells under the TR2 gates are used as the charge collectors and the data stored in register 24. When all the registers 18 through 24 have been loaded, data is removed from the registers a data bit at a time, the first bit of each of the registers first proceeding in reverse order from register 24 to register 18 and then the second bit in such register in the same order to place the data in coherent form.

In FIG. 3, the data bits in the storage registers are numbered sequentially in accordance with the proximity of the gate under which they were generated to the output of the CCD register. Thus, the TR2 gate in the *n*th bit of the CCD register generated the first bit of data while the 02 gate of the *n*th bit generated the second data bit, the TR1 gate of the *n*th bit generated the third data bit and the 01 gate of the *n*th data bit generated the fourth data bit, and so on. Therefore, when data is read out of the CCD chip after the first sensing operation using the 01 gates of the CCD register is contains the fourth, eighth, 12th, 16th, 20th, 24th data bits, and on up in steps of four until the final bit, which is bit $4n$ where, again, $n$ represents the total number of bits in the CCD shift register. This is loaded into the register 18 through AND gate 26 which is open to the exclusion of the other AND gates 30 to 34 by the decode signal from the decoder 28 provided for selecting the proper one out of the four registers 18 to 24 for loading. When shift register 18 is loaded, a second write operation is performed under the TR1 gate in each of the cells of the shift register. This is done by lowering the potential on the TR1 gates of the CCD shift register on a time T2 sufficient to cause the integration of an image. After the image time T2 the data is shifted out of the CCD shift register again, this time into register 20 through AND gate 30 which is open by a decode selection signal from decoder 28 while the other AND gates are held closed. Bits 3, 7, 11, 15, 19, 23 up to and including the bit $4n-1$ are, therefore, loaded into register 20. This operation continues using data obtained from under the 02 gates to fill register 22 through AND gate 32 and thereafter data obtained from under the TR2 gate to fill register 24 through AND gate 34. Thus, register 22 contains bits 2, 6, 10 and so on up until bit $4n-2$ of the final image and register 24 contains bits 1, 5, 9 up to and including bit $4n-3$ of the image.

When the registers 18 to 24 are completely loaded, the data stored therein is ready to be written out. This is accomplished by reading the first bit of each of registers 18 through 24, respectively, into latches 36 through 42 and then passing the data through AND gates 44 through 50 in inverse order so that bit 1 passes through AND gate 50 and out onto line 52 first, then bit 2 passes through AND gate 48 onto line 52, bit 3 passes through AND gate 46 on line 52 and, finally, bit 4 passes through AND gate 44 on line 52. Once the first four bits are out onto the line, bits 5 through 8 are loaded into the latches and the process is repeated and so on until the final positions in the shift register are transmitted out onto line 52 in numerical order from 1 through $4n$.

Above we have described one embodiment of the invention. Obviously a number of changes may be made thereon. For instance, it is not necessary to use a four-phase shift register. Obviously, a three-phase shift register could also be employed. The optical sensor described here is a line scanner made up of one serial shift register. However, a pattern sensor could also be employed. Instead of a single register a pattern scanner would use a plurality of parallel shift registers to obtain the image without the necessity of movement between the object and the sensor. Also, it is not necessary to use the back of the substrate of the chip for sensing. Light can be applied directly to the top of the surface of the chip. However, then only the polysilicon gates 14 can be employed for sensing for they are transparent, while the metal gates 16 are opaque. One significant difference between back lighted and front lighted chips is that a front lighted chip can be significantly thicker since it will not interfere with performance. Finally, other means of storing the data and reading it out in coherent form can be used in place of that shown in FIG. 3. For instance, possibly a single shift register that runs four times the rate of the CCD shift register used for sensing could be used.

While the invention has been particularly shown and described with reference to a preferred embodiment thereof, it will be understood by those skilled in the art that the above and other changes in form and details may be made therein without departing from the spirit and scope of the invention.

What is claimed is:

1. In an optical sensor using a CCD serial shift register having closely spaced gates that cannot be simultaneously employed to optically sense data, an improved method of operation comprising:

- sensing under selected gates of the shift register;
- reading out of the shift register and storing the data sensed by the selected gates as a serial string of signals;
- thereafter sensing under gates of the same shift register that are too closely spaced to the selected gates to sense simultaneously with the selected gates; and
- reading out of the shift register and intermixing the data sensed by said too closely spaced gates with the previously stored data by alternating data bits sensed under the selected bits with data bits sensed under the too closely spaced bits in a coherent serial string of data bits.

2. The method of claim 1 wherein said closely spaced gates are adjacent to the selected gates.

3. An optical scanner, comprising:

- a CCD shift register having a plurality of stages each stage including a multiplicity of gates;
- means for optically subjecting the CCD shift register to the image to be sensed;
- first gate voltage means for energizing one of the gates in each of the stages for the receipt of charge while the shift register is subjected to the image to form electrical data in a first series of data bits;
- a second gate voltage means for energizing another gate in each of the stages for the receipt of charge while the shift register is being subjected to the image but at a different time than when the said one of the gates in each of the stages is energized to form a second series of data bits;
- shift means for reading the electrical data out of the shift registers between energization of the shift registers by said first and second gate voltage means;
- storage means for storing the data read out of the shift registers, said storage means including a plurality of shift registers one for serially storing the bits of the first series of data bits and another for storing the bits of the second series of data bits; and
- interleaving means for intermixing the data bits from the first and second series of bits wherein said interleaving means includes means for first reading a bit from one register and then a bit from the other register to form a coherent data signal made up of bits from both registers.

* * * * *